Patented Mar. 7, 1933

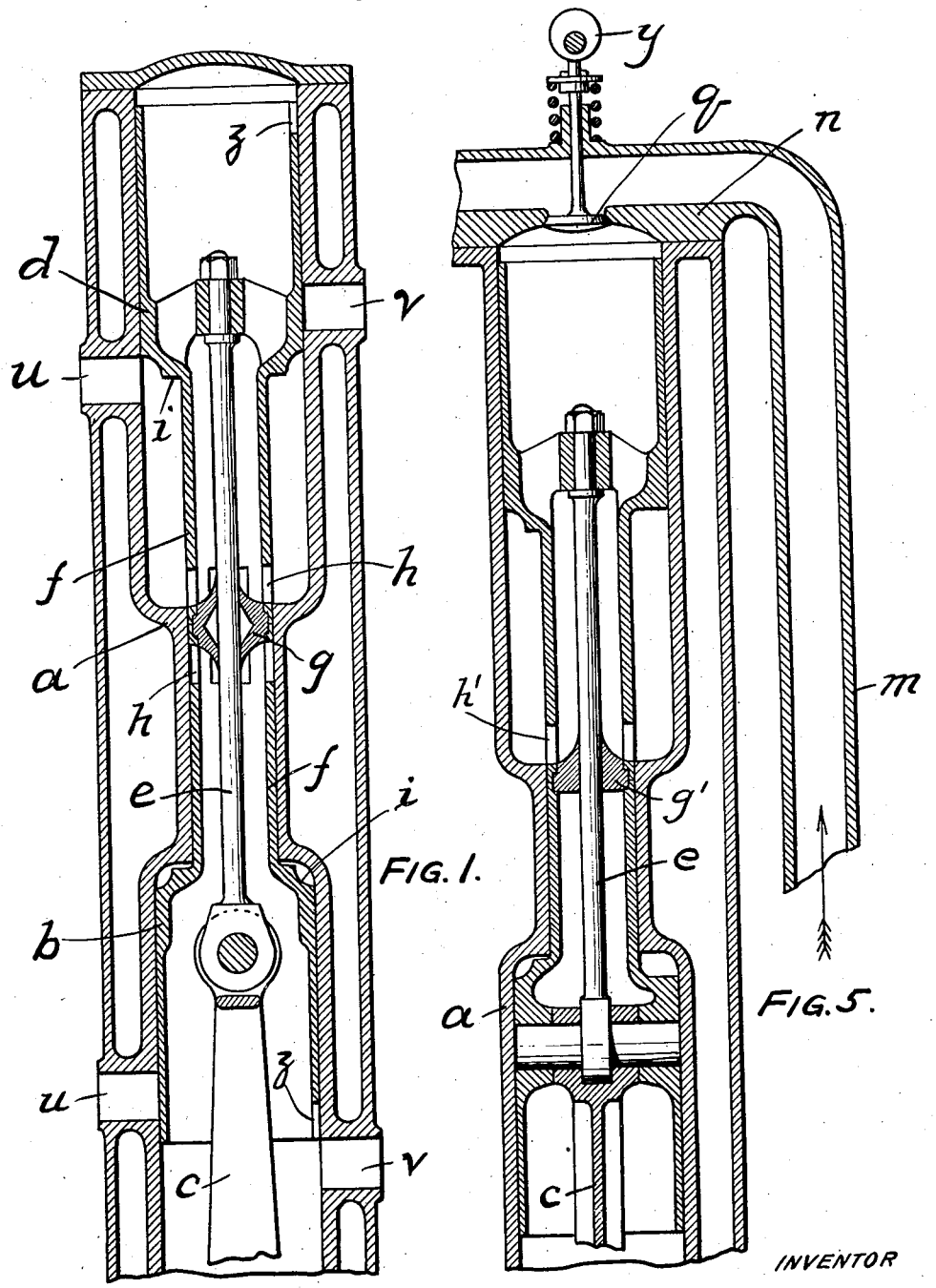

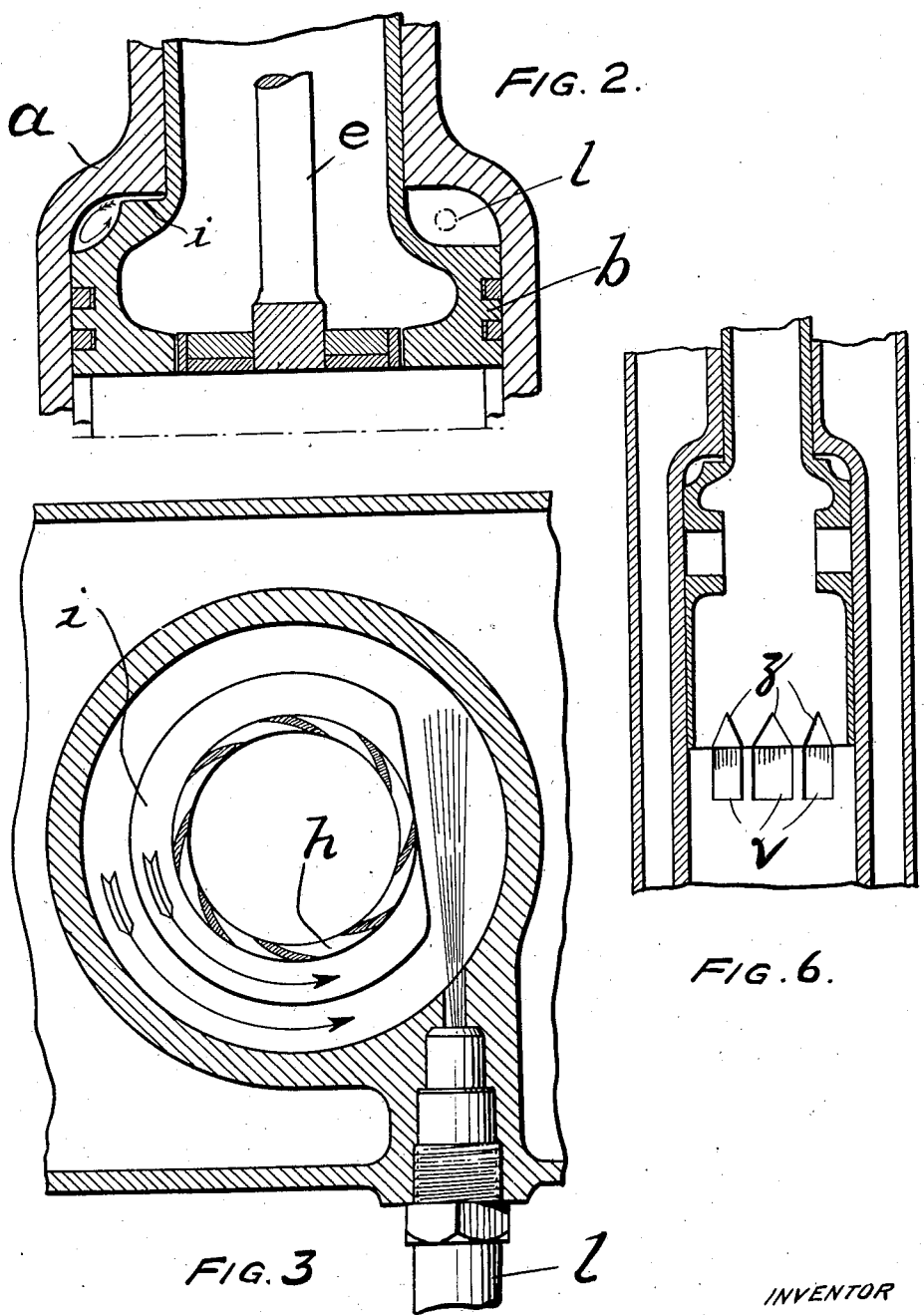

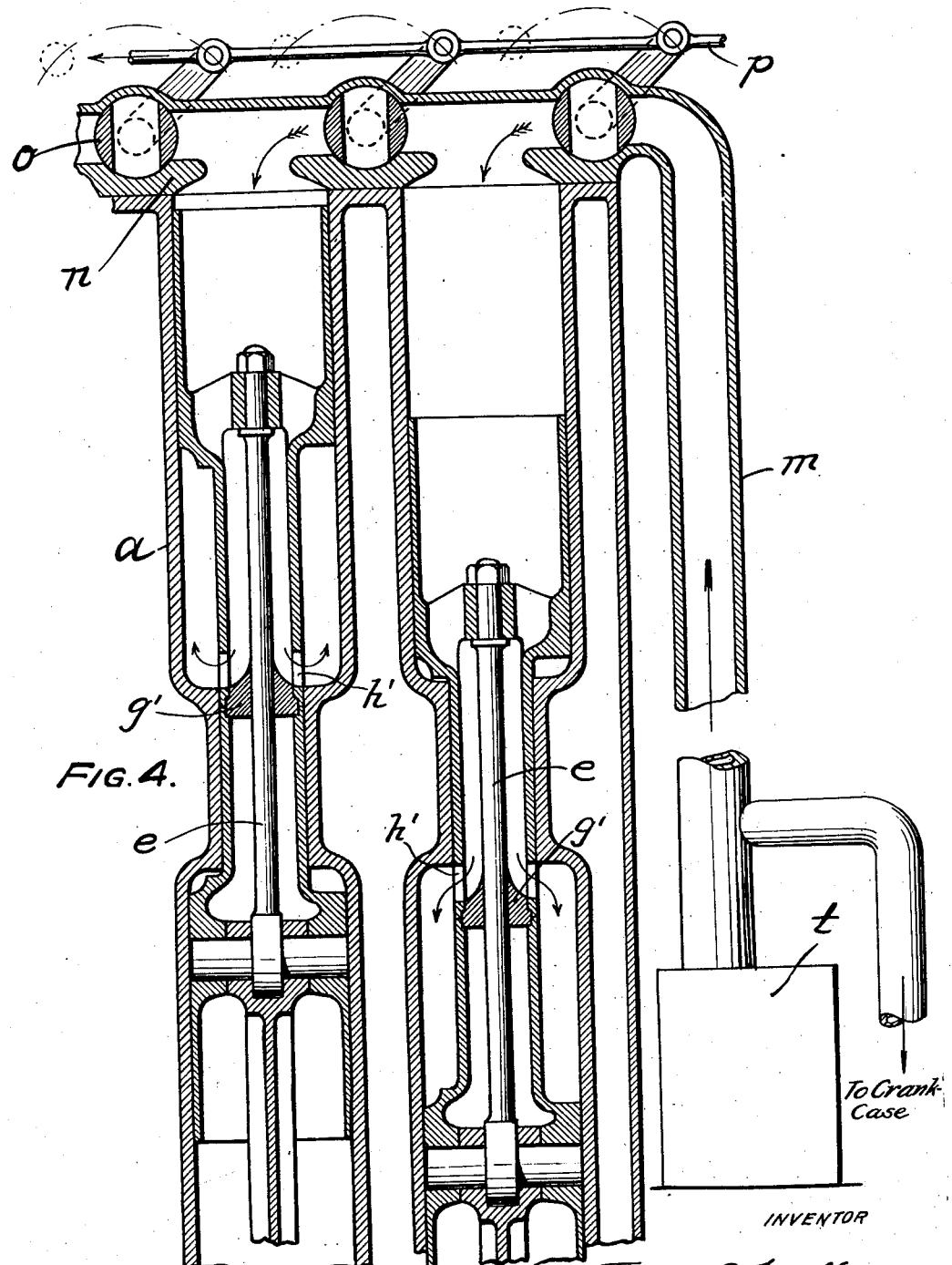

1,900,133

UNITED STATES PATENT OFFICE

JOSEPH SCHAEFFERS, OF PHILADELPHIA, PENNSYLVANIA

INTERNAL COMBUSTION ENGINE

Application filed March 13, 1931, Serial No. 522,193, and in Germany October, 1930.

This invention relates to internal combustion engines and particularly to engines of the two-cycle type.

Heretofore it has been known to provide pistons of internal combustion engines with a tubular extension or step to serve as intake port so as to scavenge the ringshaped combustion chamber upon the direct current or uniflow principle.

The present invention is intended for engines of this kind with single or double acting pistons particularly for the purpose of enabling the use of the Diesel principle. The difficulties of applying this principle lie mainly in the effort to obtain satisfactory combustion in the ring-shaped combustion chamber. A solution of this problem is illustrated in the accompanying drawings in which:

Fig. 1 is a longitudinal cross section of a cylinder with a double acting piston;

Fig. 2 is a longitudinal cross section of the combustion chamber;

Fig. 3 is a cross section of the extension or piston step and top view of the working face of the piston;

Fig. 4 is a vertical section of a multicylinder arrangement with centrifugal blower for scavenging;

Fig. 5 is a vertical section of a modification of the same having automatic one-way valves; and Fig. 6 is a vertical section of the lower edge of the working piston.

Fig. 1 shows a double cylinder $a$ surrounded with the customary water jacket and open towards both ends, in each of which a piston operates. The ends of these cylinders are provided with the usual exhaust and air intake ports $u$ and $v$. The inner or lower piston $b$ is connected in the usual manner with the crankshaft (not shown) by means of a connecting rod $c$, while the outer or upper piston $d$ is connected with the lower piston $b$ by means of a distance rod $e$. The two extensions or steps $f$ of the two pistons meet at their ends, which are both centered upon as well as closed by the two-sided deflector $g$. The pass-over or transfer ports $h$ of these piston extensions $f$ are so shaped, as illustrated in Fig. 3, as to give a rotary motion to the air passing through them so that a rotation of the air around the axis of the cylinder is initiated, which rotation is intensified by the compression and is indicated by the arrows in Fig. 3. The face of the piston between the main body and the extension is provided with a shoulder $i$, which, however, is interrupted by one (or more) cutaways as shown in Fig. 3, which cutaway provides a clear space and straight opening for the jet of fuel injected through $l$ at or near dead center into the highly compressed air. The drawings show one nozzle and one cutaway. In very large cylinders it is often advisable to use several nozzles, in which case a corresponding number of cutaways of the shoulder $i$ have to be provided. The position of the nozzle is indicated in dotted lines in Fig. 2. This shoulder $i$ serves not only to reduce the space remaining for the compression chamber, but also to cause a turbulence somewhat at right angles to the rotary motion of the fresh air and as indicated by the arrow in Fig. 2 by reason of the fact that the gas between the shoulder and cylinder end is forced outwardly at the end of a stroke. The nozzle $z$ is so placed as to shoot the fuel into the air stream with and not against its rotation.

In engines of large dimensions and with multicylinder arrangements it is not desirable to use crank case compression since plain bearings and force-feed oiling through the crankshaft would cause too much oil to pass into the cylinders. Therefore a blower or compressor is needed. Centrifugal blowers or pumps for the scavenging of two-cycle engines usually can be used only if provided with an independent drive, since scavenging air is needed right from the start, while the centrifugal blower has to get up a certain speed first, before it begins pumping air. Fig. 4 shows an arrangement in which a centrifugal blower driven by the engine pumps air through the pipe $m$ to the cylinder head $n$. Shut-off valves $o$ are provided in this cylinder head $n$ connected by means of a manually operable push and pull rod $p$ so that all the cylinders can be connected to or separated from the air pipe $m$ and each other.

For starting these shut-off valves *o* are set as shown in Fig. 4. On moving downward the upper piston creates a partial vacuum in the cylinder space above it, which low pressure is equalized as soon as the intake ports *h'* of the piston extension *f* connect with the lower cylinder, as they then communicate through this cylinder and its exhaust port with the atmosphere. On returning i. e. moving upward the air above the upper piston is compressed in the cylinder space until the intake ports *h'* connect with the working part of the upper cylinder. As soon as this happens the slightly compressed air streams through the piston extension to the working space of the upper cylinder, scavenging the same completely and leaving it filled entirely with fresh air. On moving downward the upper piston compresses this air charge which receives a charge of fuel at or near the end of the compression stroke and sets the engine into action, which for the moment fires only with the upper cylinders. As soon as sufficient speed has been attained to reach the blower pressure necessary for smooth functioning of the engine, the shut-off valves *o* are opened, air is then charged by the blower into all the cylinders and the lower set of them is then cut in on the fuel injection, enabling the engine to operate on all its cylinders. With this arrangement it is necessary to have separate exhaust pipes for the upper and lower series of cylinders. If this should present difficulties a valve arrangement as shown in Fig. 5 can be used, by which light automatic suction valves *q* take the place of the manually operated shut-off valves *o*. In this way the partial vacuum above the upper piston is reduced materially by the action of the automatic valve, which can have a very light or weak spring as it functions only at very slow speed. As soon as the upper series of cylinders are working and the blower providing the necessary scavenging air, these automatic suction valves *q* can be locked firmly in their open position, for example, by manually operated cams *y*, after which the lower set of cylinders is cut in as well.

These shut-off valves *o* or automatic suction valves *q* are not needed in case a positive blower or compressor of the Roots or vane type is used, as these furnish scavenging air in proper volume at low speeds and sufficient for starting as well. The same valve arrangement can of course be used in connection with only a single set of cylinder and double acting piston.

However in small and low cost units, where no blower or compressor is used but crankcase compression instead, and air or gas is drawn in through ports *v* operated by the lower edge of the piston, then it is advisable to recess this lower piston edge as shown in Fig. 6 in the shape of triangular or tapered cut-aways or a series of drilled holes forming a tapered opening. In this way the intake period is lengthened somewhat but mostly the abrupt starting and stopping of the suction effect is smoothed out, which results in better volumetric efficiency as well as in better fuel economy.

In motors provided with a blower or compressor it is also possible to connect the air pipe *m* with the crankcase as well as with the cylinder head *n*, in which case the crankcase serves only as an accumulator, particularly in multicylinder engines with the crankcase forming a unit without separating walls, as otherwise customary, between adjoining cylinder units, but of course firmly closed and secured against leakage into the atmosphere.

It will be noted that particular arrangement of ports *h'* illustrated in the modifications of Figs. 4 and 5 is particularly advantageous in that the same series of ports serves for the introduction of air into port at upper and lower combustion chambers. Accordingly, the length of the cylinder assembly is considerably shortened for a given stroke. It may be pointed out that the single guide points *g'* used in these modifications have the advantageous function of the guide point *g* of Fig. 1, in serving to maintain the piston extensions in proper alignment, while serving to form a closure cutting off communication between them.

What I claim and desire to protect by Letters Patent is:

1. A two-cycle internal combustion engine comprising a cylinder having an extension of reduced bore, a piston arranged to reciprocate within the cylinder and having a tubular extension reciprocable in the cylinder extension, said parts forming an annular combustion chamber about the tubular extension, the piston having a shoulder formed on a portion of its annular working face adapted to closely approach the end of the cylinder and thereby produce turbulence towards the end of the compression stroke.

2. A two-cycle internal combustion engine comprising a cylinder having an extension of reduced bore, a piston arranged to reciprocate within the cylinder and having a tubular extension reciprocable in the cylinder extension, said parts forming an annular combustion chamber about the tubular extension, the piston having a shoulder formed on a portion of its annular working face adapted to closely approach the end of the cylinder, and at least one nozzle arranged to direct fuel tangentially into the combustion chamber, said shoulder being cut away to provide a clear space for the injected fuel.

3. A two-cycle internal combustion engine comprising a cylinder having an extension of reduced bore, a piston arranged to reciprocate within the cylinder and having a tubular extension reciprocable in the cylinder extension, said parts forming an annular combustion chamber about the tubular extension, the piston having a shoulder formed on a portion of its annular working face adapted to closely approach the end of the cylinder, said tubular extension being provided with a plurality of ports providing a passage for air into the combustion chamber, the ports being directed angularly relatively to the radii to initiate rotary movements of the charges passing therethrough.

4. A two-cycle internal combustion engine comprising a cylinder having exhaust openings and an extension of reduced bore, a piston arranged to reciprocate within the cylinder and having a tubular extension reciprocable in the cylinder extension, a compressor, and means for cutting off the compressor from the intake opening whereby the engine is adapted to start independently of the compressor by creating its own precompression.

5. A two-cycle internal combustion engine comprising a plurality of cylinders, each having exhaust openings and an extension of reduced bore, pistons arranged to reciprocate within the cylinders and having tubular extensions reciprocable in the cylinder extensions, a compressor, and means for cutting off the compressor from the intake passages of the cylinders and the intake passages of the various cylinders from each other whereby the engine is adapted to start independently of the compressor by creating its own pre-compression.

6. A two-cycle internal combustion engine comprising twin-cylinders and pistons therein arranged in reverse tandem to give double acting effect, said cylinders being joined by a bore of reduced size, and the pistons being associated with extensions reciprocable in the bore, and a distance rod connecting the pistons.

7. A two-cycle internal combustion engine comprising twin cylinders and pistons therein arranged in reverse tandem to give double acting effect, said cylinders being joined by a bore of reduced size, and the pistons being associated with extensions reciprocable in the bore, and a distance rod connecting the pistons, said distance rod extending through the extensions.

8. A two-cycle internal combustion engine comprising two cylinders and pistons therein arranged in reverse tandem to give double acting effect, said cylinders being joined by a bore of reduced size, and the pistons being associated with extensions reciprocable in the bore, and a distance rod connecting the pistons, one of the pistons carrying a wrist pin, the distance rod being connected to the wrist pin.

9. A two-cycle internal combustion engine comprising twin cylinders and pistons therein arranged in reverse tandem to give double acting effect, said cylinders being joined by a bore of reduced size, and the pistons being associated with extensions reciprocable in the bore, the extensions being provided with closure means intermediate the pistons and being closed between the closure means and one piston but provided with transfer ports between the closure means and the other piston, said ports being arranged to open to the cylinders at both ends of the reduced bore whereby they serve for the introduction of air or gas to both cylinders.

10. A two-cycle internal combustion engine comprising twin cylinders and pistons therein arranged in reverse tandem to give double acting effect, said cylinders being joined by a bore of reduced size, a separating member acting as a deflector, said pistons having extensions reciprocable in the bore and joined to the separating member.

11. A two-cycle internal combustion engine comprising twin cylinders and pistons therein arranged in reverse tandem to give double acting effect, said cylinders being joined by a bore of reduced size, a separating member acting as a deflector, joined to the separating member, said separating member serving to align the extensions within the bore.

12. A two-cycle internal combustion engine comprising a cylinder having intake and exhaust passages and an extension of reduced bore, a piston arranged to reciprocate within the cylinder and having a tubular extension reciprocable in the cylinder extension, a compressor, said engine having an enclosed crank case, and connections from the compressor to both the intake passage and the crankcase.

13. A two-cycle internal combustion engine comprising a cylinder having intake and exhaust openings and an extension of reduced bore, a piston arranged to reciprocate within the cylinder and having a tubular extension reciprocable in the cylinder extension, said intake openings being arranged to be covered and uncovered by the edge of the piston opposite its working face, said edge having tapered cut-outs adapted to align with the intake openings for the purpose of lengthening the time of the intake period and preventing the abrupt stoppage of the air or gas flow.

14. A two-cycle internal combustion engine comprising twin cylinders and pistons therein arranged in reverse tandem to give a double acting effect, said cylinders being joined by a bore of reduced size, and the pistons therein being associated with extensions reciprocable in the bore, one only of said extensions having transfer ports arranged therein to serve for the introduction of air or gas to open cylinders, the extension of the other piston being closed.

15. A two-cycle internal combustion engine comprising a cylinder having intake and exhaust openings, a piston arranged to reciprocate within the cylinder, said intake openings being arranged to be covered and uncovered by the edge of the piston opposite its working face, said edge having tapered cutouts adapted to align with the intake openings for the purpose of lengthening the time of the intake period and preventing the abrupt stoppage of the air or gas flow.

In testimony of which invention, I have hereunto set my hand, at Philadelphia, Penna., on this 7th day of March, 1931.

JOSEPH SCHAEFFERS.